Dec. 25, 1951     O. D. PREMO     2,579,857
DRAFTING INSTRUMENT
Filed Sept. 9, 1946
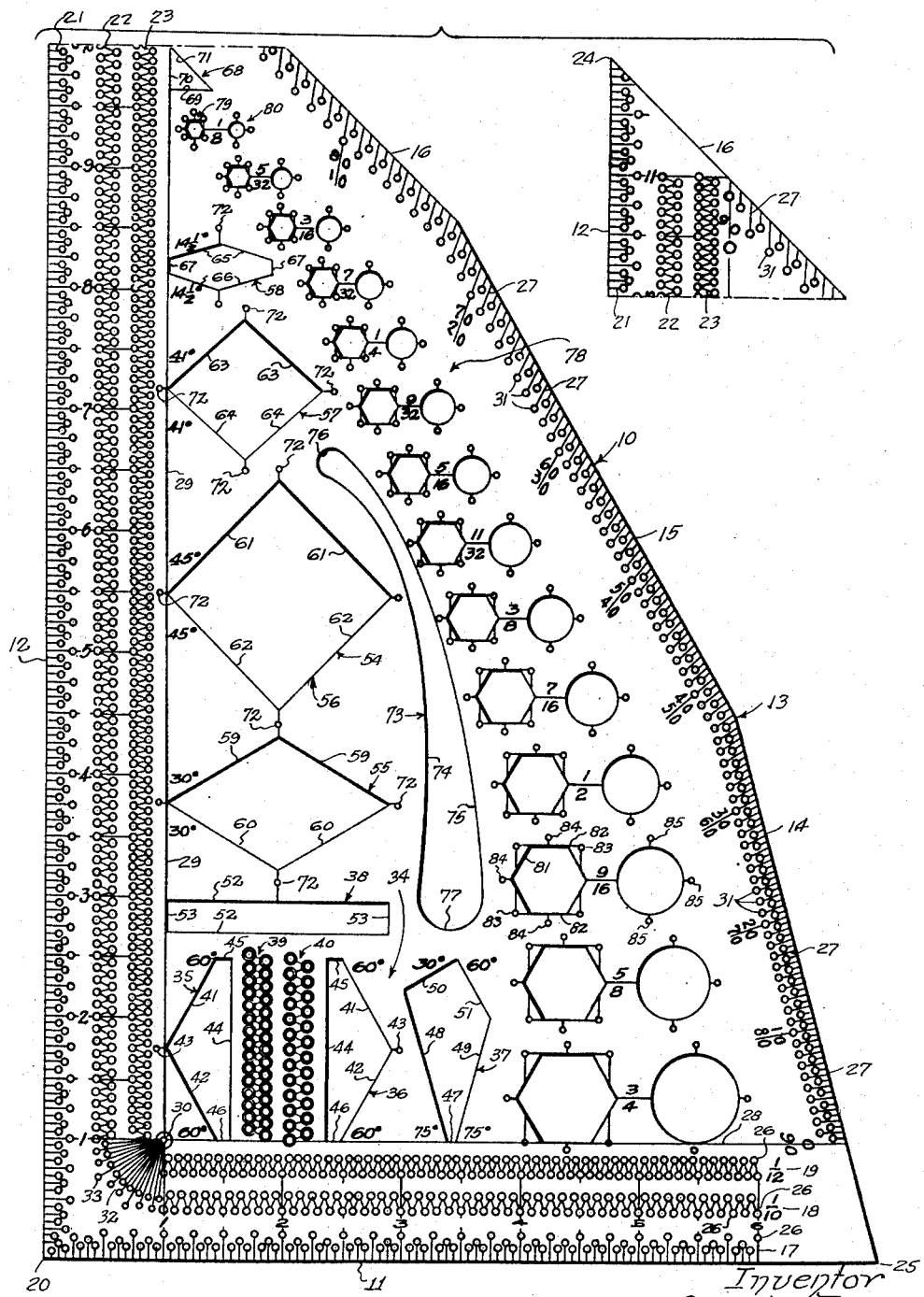
Inventor
Owen D. Premo
by Barthel & Bugbee
Att'ys Patented Dec. 25, 1951

2,579,857

UNITED STATES PATENT OFFICE 2,579,857

DRAFTING INSTRUMENT

Owen D. Premo, Muskegon Heights, Mich.

Application September 9, 1946, Serial No. 695,698

1 Claim. (Cl. 33—104)

This invention relates to drafting instruments.

One object of the invention is to provide a drafting instrument of polygonal outline having two of its edges at right angles and its hypotenuse divided into a plurality of straight portions making different angles with the base and altitude, so as to provide a large number of angles in a given instrument and reduce the need for using a protractor.

Another object is to provide a polygonal drafting instrument to replace the ordinary draftman's triangles with a single instrument capable of performing all the functions of several separate triangles.

Another object is to provide a polygonal drafting instrument having multiple dimension scales along its base and altitude with the divisions thereof indicated by needle point holes to facilitate quick and accurate layout of dimensions, the scales including, for example, graduations in sixteenths, tenths and twelfths of an inch, thereby including all graduations commonly used by draftsmen in the majority of their work.

Another object is to provide a polygonal drafting instrument having protractor graduations along the hypotenuse, with needle point holes indicating the angle in degrees struck off from a central point.

Another object is to provide a polygonal drafting instrument having an internally located small protractor on the opposite side of the center point from the large protractor, as set forth in the object immediately preceding, with the major graduations of the small protractor likewise indicated by needle point holes.

Another object is to provide a polygonal drafting instrument having a plurality of cut-out portions of outline suitable for forming lettering guides, in conjunction with dimension holes for indicating the heights of the letters to be drawn, and needle point holes for accurately locating these cut out portions.

Another object is to provide a polygonal drafting instrument having a multiplicity of adjacently arranged hexagonal and circular cut-out portions, the circles being of a size inscribed in the corresponding hexagon, with needle point holes to indicate the corners of the square which is of the same cross dimension as the diameter of the circle, and preferably also with needle point holes to indicate the positions of the perpendicular cross-diameters so as to facilitate locating the centers of the circles, thereby facilitating the layout of bolts, screws, screw threads and the like.

Another object is to provide a polygonal drafting instrument having rectilinear cutout portions with their sides arranged at varying angles to one another for the drawing of different machine details having lines arranged at such angles, for example, screw threads, worm threads, rack teeth, V-blocks and grooves, drill points, gibs, lathe centers, etc.

Another object is to provide a polygonal drafting instrument having an elongated irregular curve cutout portion located between the cutout portions set forth in the preceding objects to facilitate the drawing of irregular curves which are not easily constructed by means of a compass.

Other objects and advantages of the invention will become apparent during the course of the following description of the accompanying drawing which shows a preferred embodiment of a polygonal drafting instrument according to the present invention, the figure being divided into two parts to accommodate it full-size upon a single sheet.

Referring to the drawing in detail, the two bracketed portions of the single figure show a polygonal drafting instrument, generally designated 10. The figure is divided into two portions so as to show it in its full size, with the inch scales along its base and altitude in their exact dimensions, the officially prescribed space on the drawing sheet being insufficient for showing the instrument full size in a single figure. The figure is also shown in its full size because of the extremely minute size of the needle point holes therein which would otherwise be obscured by reducing the size of the instrument in order to accommodate it within a single figure.

Angular edge portions

The polygonal drafting instrument 10 is roughly in the form of a triangle of conventional thickness usual in draftman's triangles and of the usual transparent material. The instrument is provided with a base edge 11 and altitude edge 12 at right angles to one another, and with an oblique or inclined edge 13 for convenience called the hypotenuse edge 13. The hypotenuse edge, however, is not a single straight line, as in a right triangle, but instead consists of three hypotenuse edge portions 14, 15 and 16 respectively. The hypotenuse edge portions 14, 15 and 16 are so arranged that they form angles of 75 degrees, 60 degrees and 45 degrees with the base edge 10, and their lengths are approximately equal so as to provide the maximum bearing surface against a T-square against which they are placed during use. Thus, the hypotenuse edge 13 is divided into approximately three equal portions at different angles to the base edge 11 and altitude edge 12.

Edge scales

The rectangular zone adjacent the base edge 11 is inscribed with scales 17, 18 and 19 in three parallel rows graduated in sixteenths, tenths and twelfths of an inch, to the full length of six inches from the corner 20. Similarly, the rectangular zone adjacent the altitude edge 12 is inscribed with scales 21, 22 and 23 graduated in similar dimensions and extending to the full height of twelve inches to the apex or upper corner 24. The hypotenuse edge 13 extends from the upper corner 24 to a lower corner 25, as previously stated, in three substantially equal but differently angled edge portions. The graduations in the scales 17, 18, 19, 21, 22 and 23 are indicated by lines terminating in needle point holes 26, these being staggered to accommodate them more easily and to place similar graduations at similar intervals along the same horizontal or vertical lines. The needle point holes 26 of the inner scales 18, 19, 22 and 23 are alternately interconnected by zigzag lines to facilitate locating the proper dimensions. As shown, each inch in the tenth inch scale 18 or 22 actually is divided into twentieths, whereas each inch in the twelfth inch scale 19 or 23 is actually divided in twenty-fourths, with the needle point holes of the tenth and twelfth inch graduations placed on one line and those of the twentieth and twenty-fourth inch graduations on a parallel line.

The needle point holes 26 are preferably of the smallest practical diameter to accommodate the point of a scribing needle, a diameter of one fiftieth of an inch (0.020 inch) being found suitable for this purpose. Starting from the corner 20 between the base and altitude edges 11 and 12, the inch graduations are indicated by the appropriate numerals.

Protractor scales

The hypotenuse edge 13 is graduated to form a protractor scale 27 extending between the reference lines 28 and 29 parallel to the base and altitude edges 11 and 12 respectively and intersecting at the center point 30. The degree graduations in the protractor scale 27 are similarly indicated by staggered needle point holes 31 in parallel rows, and are designated by the appropriate numerals at 10 degree intervals between the outer ends of the lines 28 and 29. The instrument is also provided with a minor protractor 32 adjacent the corner 20 with lines extending thither from the central point 30 at five degree intervals and terminating in needle point holes 33, likewise in staggered arrangement in two rows. The point 30 also has a needle point hole.

Lettering guide portion

The lettering guide portion, generally designated 34, is located in the lower left-hand corner of the instrument immediately inside the zones containing the scales 17, 18, 19, 21, 22 and 23. The lettering guide portion 34 includes four rectilinear cutouts 35, 36, 37 and 38 and two sets of pencil holes 39 and 40. The cutouts 35 and 36 are similar in outline but face oppositely and consist of inclined sides 41 and 42 subtending an included angle of 120° and having a needle point locating hole 43 adjacent the vertex thereof. Opposite the sides 41 and 42 is a vertical side 44 and at top and bottom are horizontal sides 45 and 46 respectively, the latter coinciding with the line 28. The sides 41 and 42 are arranged at an angle of 60 degrees to the horizontal line 28, which in turn is parallel to the base edge 11 of the instrument.

The cutout 37 is provided with a lower horizontal side 47 coinciding with the line 28, lower sides 48 and 49 inclined at angles of 75° to the side 28, and upper sides 50 and 51 inclined at angles of 30° and 60° respectively thereto. The cutout 38 is rectangular and is provided with horizontal sides 52 and vertical sides 53 respectively parallel to the base edge 11 and altitude edge 12 of the instrument. The pencil holes 39 and 40 are in staggered rows with the holes in each row $\frac{1}{8}$ inch and $\frac{1}{10}$ inch apart respectively, giving increments of $\frac{1}{16}$ inch and $1/20$ inch respectively for ruling off letter heights. One of these holes in each of the groups 39 and 40 is on a horizontal line which bisects the angle between the sides 41 and 42, hence passes through the needle hole 43 so that measurements of letter height can be made equidistant from the center of this 120° angle. The pencil holes 39 and 40 are preferably tapered so as to facilitate insertion of a pencil point, the holes being of any convenient size, a satisfactory size having been found, for example, to be approximately $\frac{1}{32}$ of an inch diameter at the bottom and $\frac{3}{32}$ inch at the top.

Thread guide portion

The thread guide portion generally designated 54 of the instrument is located immediately above the lettering guide portion 34 and consists of four rectilinear cutouts 55, 56, 57 and 58 respectively of different shapes and angles of sides. The lowest cutout 55 has upper and lower sides 59 and 60 respectively inclined at angles of 30° to the base edge 11, and including angles of 60° and 120° respectively. The cutout 56 has upper and lower sides 61 and 62 inclined at angle of 45° to the base edge 11, hence including angles of 90°. The cutout 57 has upper and lower sides 63 and 64 respectively inclined at angles of 41° to the base edge 11, thereby subtending angles of 82° horizontally and 98 degrees vertically. The cutout 58 has upper and lower sides 65 and 66 respectively which are inclined at an angle of 14.5° to the base edge 11, thereby giving included angles of 29° horizontally and 151° vertically. The sides of the cutout 58 are truncated so that the inclined sides 65 and 66 do not meet but are joined by vertical sides 67.

Above the cutout 58 is a triangular cutout 68 in the shape of a 45°–90° right triangle, with base 69 parallel to the base edge 11, its altitude 70 parallel to altitude edge 12, and with its hypotenuse 71 at a 45° angle to both. This triangular cutout 68 provides for the drawing of lines with a 45° included angle, either horizontally or vertically. Each of the foregoing cutouts 55, 56, 57 and 58 is provided with needle point holes 72 aligned with all or certain of their corners, to facilitate locating the cutout properly on the work.

To the right of the thread guide portion 54 is an irregular curve cutout 73 of greatly elongated shape. This cutout has variably curved opposite sides 74 and 75 interconnected by upper and lower curved ends 76 and 77 respectively, and is used for drawing curved portion of drawings which are not easily drawn with the aid of a compass.

Bolt and screw guide portion

Arranged in an obliquely extending zone adjacent the hypotenuse edge 13 of the drafting instrument 10 is the bolt and screw guide portion 78. This consists of two rows of cutouts 79 and 80 of graduated sizes according to the sizes of the heads of bolts and screws to be drawn. The cutouts 79 include hexagons 81 with circumscribed squares 82 of the same cross-diameters and their corresponding cutouts 80 are circles likewise of the same cross-diameters so as to represent the circles inscribed in the squares 82 or hexagons 81. The corners of the squares 82 are designated by needle point holes 83 and the ends of the horizontal and vertical bisectors or cross-diameters of the hexagons 81 and circular cutouts 80 are indicated by needle point holes 84 and 85 respectively. The hexagonal and circular cutouts 81 and 80 are arranged in pairs side by side so that a very slight shift of the instrument brings the one into the position previously occupied by the other. Thus the heads and ends of bolts, nuts, screws and studs of various kinds are quickly and easily drawn. The various pairs of cutouts 79 and 80 are designated by fractions indicating the size thereof so that the proper pair of cutouts may be quickly selected without loss of time and used without loss of motion.

*Operation*

The drafting instrument 10 may be used in a large variety of ways to assist the draftsman in drawing a majority of the lines and laying off a majority of the dimensions or angles used in his work. Much of the operation is self-evident from the foregoing description. The base and altitude edges 11 and 12 and the hypotenuse edges 14, 15 and 16 are used to draw straight lines, either horizontal or vertical or inclined to the horizontal at angles of 75°, 60°, or 45° when the base edge 11 rests on the T-square. When the altitude edge 12 rests on the T-square, the hypotenuse portions 14, 15 and 16 are used to draw lines inclined at angles of 15°, 30° and 45° respectively relative to the T-square or horizontal. When the first hypotenuse portion 14 rests on the T-square, the base edge 11 and altitude edge 12 are used to draw lines at angles of 75° and 15° respectively, relative to the T-square. When the second hypotenuse portion 15 rests on the T-square, the base edge 11 and altitude edge 12 are used to draw lines at angles of 60° and 30° relative to the T-square. When the third hypotenuse portion 16 rests on the T-square, either the base edge 11 or altitude edge 12 is used to draw a line at an angle of 45° to the T-square. In this manner, the drafting instrument 10 may be used to draw lines at any angle to either the horizontal or the vertical, from 15° to 90° at intervals of 15°, the T-square edge serving as a base line. The three hypotenuse portions 14, 15 and 16 are of approximately equal length so as to give the maximum bearing surface on the T-square and thereby to minimize rocking. In a similar manner, the instrument may be used to divide a circle by increments of 15° into a total of 24 divisions.

The eighth, tenth and twelfth inch scales 17, 18, 19, 21, 22 and 23 with their needle point holes 26 enable the draftsman to perform accurate dimensioning of machine parts without recourse to additional scales. All three scales are frequently required in order to dimension a single part, for example, in gearing. Gears are commonly used having six, eight and ten diametral pitch. For the six diametral pitch gear, the addendum and dedendum circles are approximately ⅛ inch, hence the twelfth scale 19 or 23 is used with its twenty-fourth inch divisions. For an eighth diametral pitch gear, the eighth inch scale 17 or 21 is used with its sixteenth inch divisions. When dimensioning is made according to the decimal system, such as in naval architecture and machinery, the tenth inch scale 18 or 22 is used with its twentieth inch divisions. In each case, the needle point is inserted through the proper hole 26 and a prick point made in the drawing to guide the subsequent drafting. As it is not uncommon to have eight, ten and twelve diametral pitch gears on the same sheet of details, the drafting instrument 10 can be used to dimension all three without requiring any additional scales. Furthermore, much architectural drafting and machine drawings are made to a scale of one inch equalling one foot and in such work, the twelfth inch scale 19 or 23 is used without the necessity of recourse to additional scales or to the more laborious procedure of interpolating between the 1/16 inch graduations on an ordinary scale. The use of the needle point is much more accurate than that of a pencil point.

To lay out angles, the protractor scale 27 is employed, using the center point 30 and the line 28 or 29 for reference. A needle point is used to lay out a prick point for the correct angle. The small protractor 32 near the corner 20 of the instrument is employed to enable the easier lining up of the desired angle to the center 30, and the accurate division is located on the large protractor scale 27. The use of the needle point holes 26 and 32 eliminates parallax which occurs when scales are ordinarily inscribed on draftsman's triangles, because these scales are placed on the top surface of the triangle and its thickness creates a parallax error.

The lettering guide portion 34 at the lower left-hand corner of the instrument enables either vertical lettering or slant lettering to be quickly and easily drawn, the sides 41 and 42 giving included angles of 120° or angles of 60° to the T-square edge or base line. The pencil holes 39 or 40 used in conjunction with the cutouts 35, 36, 37 and 38 enable the heights of the letters to be accurately laid out and ruled off by means of a pencil inserted through the holes. The cutout 37 enables lines of 30°, 60° or 75° inclinations to be drawn in lettering, and the cutout 38 enables horizontal and vertical letter lines to be drawn.

To lay out screw threads, V-blocks, gibs, screw heads, chamfers, etc. the thread guide portion 54 is used. The cutout 55 with its 60° and 120° angles is used for the layout of drill points, bottoms of drill holes, sides of hexagons, 30° and 60° chamfers, and center drills or lathe centers. The cutout 56 is used for laying out parts having 45° or 90° angles, such as squares, V-grooves or ridges, 45° chamfers, sectioning and the like. The cutout 57 with its 82° included angles is used for the layout of flat head and oval head machine screws, cap screws and wood screws. The cutout 58 with its 29° included angle is used for acme screw threads, worm threads, teeth of gear racks and 14.5° pressure angles, and the like. These cutouts are also used in conjunction with the scales 17, 18 and 19 or 21, 22 and 23 to lay out the dimensions of the threads according to the number per inch.

The bolt and screw guide portion 78 is used to draw the heads of square and hexagonal head machine screws and nuts, as explained in connection with the construction thereof. This arrangement of the inscribed circle adjacent the square and hexagon to which it pertains requires only a slight shift of the instrument for its use, and the proper set is immediately selected according to the designating fraction inscribed between them.

The irregular curve cutout 73 is used, as described in connection with its construction, for the drawing of curves which are not easily drawn with the aid of a compass.

The arrangement of the various parts and portions of the drafting instrument 10 in a compact form with a minimum of movement required to accomplish the various operations reduces the smearing of the drawings to a minimum. This smearing occurs frequently in the use of conventional instruments because of the necessity of changing from one form of triangle to another or shifting to various scales, irregular curves, etc. The present instrument, by combining all of the important features into a single instrument and by grouping these features together, solves this problem.

Although the instrument has been described as made from transparent material, it is also contemplated that where high precision is of greater importance than transparency, the instrument may be made of a more durable material not subject to shrinkage. Such a material is stainless steel, and its employment adapts the instrument to use by machinists, carpenters and other workers requiring a very durable and precise instrument.

While I have shown and described my invention in detail, it is to be understood that the same is to be limited only by the appended claim, for many changes may be made without departing from the spirit and scope of my invention.

What I claim is:

A drafting instrument comprising a polygonal plate-like member with a reference edge and including a fastener head guide portion with a multiplicity of pairs of circle and hexagon cut-outs arranged side by side in a single path extending alongside said reference edge and increasing progressively in size from one end of said path to the other end of said path, the circle cut-out of each pair having a diameter substantially equal to the inscribed circle of the corresponding hexagon cut-out, and needlepoint holes through said plate-like member located adjacent certain corners of said hexagon cut-outs, the needlepoint holes adjacent the corners of each hexagon cut-out forming the corners of a square of substantially the same dimensions as the diameter of the corresponding circle cut-out of each pair of hexagon and circle cut-outs.

OWEN D. PREMO.

REFERENCES CITED

The following references are of record in the file of this patent:

UNITED STATES PATENTS

| Number | Name | Date |
|---|---|---|
| D. 138,016 | Gilardi | June 6, 1944 |
| D. 139,083 | Macht | Oct. 10, 1944 |
| 434,073 | Rondinella | Aug. 12, 1890 |
| 462,126 | Griffiths | Oct. 27, 1891 |
| 727,680 | Otis | May 12, 1903 |
| 1,139,229 | Requa | May 11, 1915 |
| 1,433,083 | Leishmann | Oct. 24, 1922 |
| 1,579,137 | Pecker | Mar. 30, 1926 |
| 1,667,191 | Chopin | Apr. 24, 1928 |
| 1,704,540 | Keuffel | Mar. 5, 1929 |
| 1,751,366 | Shaub | Mar. 18, 1930 |
| 1,755,024 | Sanden | Apr. 15, 1930 |
| 2,043,729 | Bilder | June 9, 1936 |
| 2,122,732 | Uyeda et al. | July 5, 1938 |
| 2,242,286 | Boughton | May 20, 1941 |
| 2,243,579 | Rodi | May 27, 1941 |
| 2,247,362 | Dibble | July 1, 1941 |

FOREIGN PATENTS

| Number | Country | Date |
|---|---|---|
| 2,365 | Great Britain | Feb. 2, 1895 |
| 1,564 | Great Britain | 1910 |
| 5,753 | Great Britain | Mar. 10, 1910 |
| 662,148 | France | Mar. 18, 1929 |
| 268,259 | Italy | Oct. 9, 1929 |
| 102,293 | Australia | Oct. 23, 1936 |